United States Patent [19]

White

[11] 3,969,022
[45] July 13, 1976

[54] SYSTEM FOR PRODUCING A COLORED MOTION PICTURE FILM FROM BLACK-AND-WHITE MEDIUM

[76] Inventor: Deloy J. White, Andes 51, Mexico City 20, Mexico

[22] Filed: Mar. 9, 1971

[21] Appl. No.: 122,299

[52] U.S. Cl. ............................ 352/38; 96/2; 96/42; 352/47; 352/50; 352/51; 352/81; 355/88
[51] Int. Cl.² ............................ G03C 11/18
[58] Field of Search ............ 352/38, 45, 47, 50, 352/51, 87; 355/78, 88; 96/2, 42

[56] References Cited
UNITED STATES PATENTS

| | | | |
|---|---|---|---|
| 2,127,829 | 8/1938 | O'Brien | 352/51 |
| 2,927,857 | 3/1960 | Pohl | 355/88 X |
| 3,133,814 | 5/1964 | Pohl | 96/2 |
| 3,619,051 | 11/1971 | Wright | 352/87 X |

*Primary Examiner*—Richard C. Queisser
*Assistant Examiner*—Frederick Shoon
*Attorney, Agent, or Firm*—Nilsson, Robbins, Dalgarn & Berliner

[57] ABSTRACT

A system is disclosed for producing a colored-motion picture film from a black-and-white source film. Each frame of the black-and-white film is projected as an image onto a work surface to which colors are applied within selected areas for combination with the projected black-and-white image to provide a color composite. The color composite is then photographed with color sensitive film. The black-and-white film is processed frame-by-frame, preserving registration from one frame to the next (in a sequence) with the colored format which is accordingly modified to a limited extent to produce each composite that is photographed.

1 Claim, 7 Drawing Figures

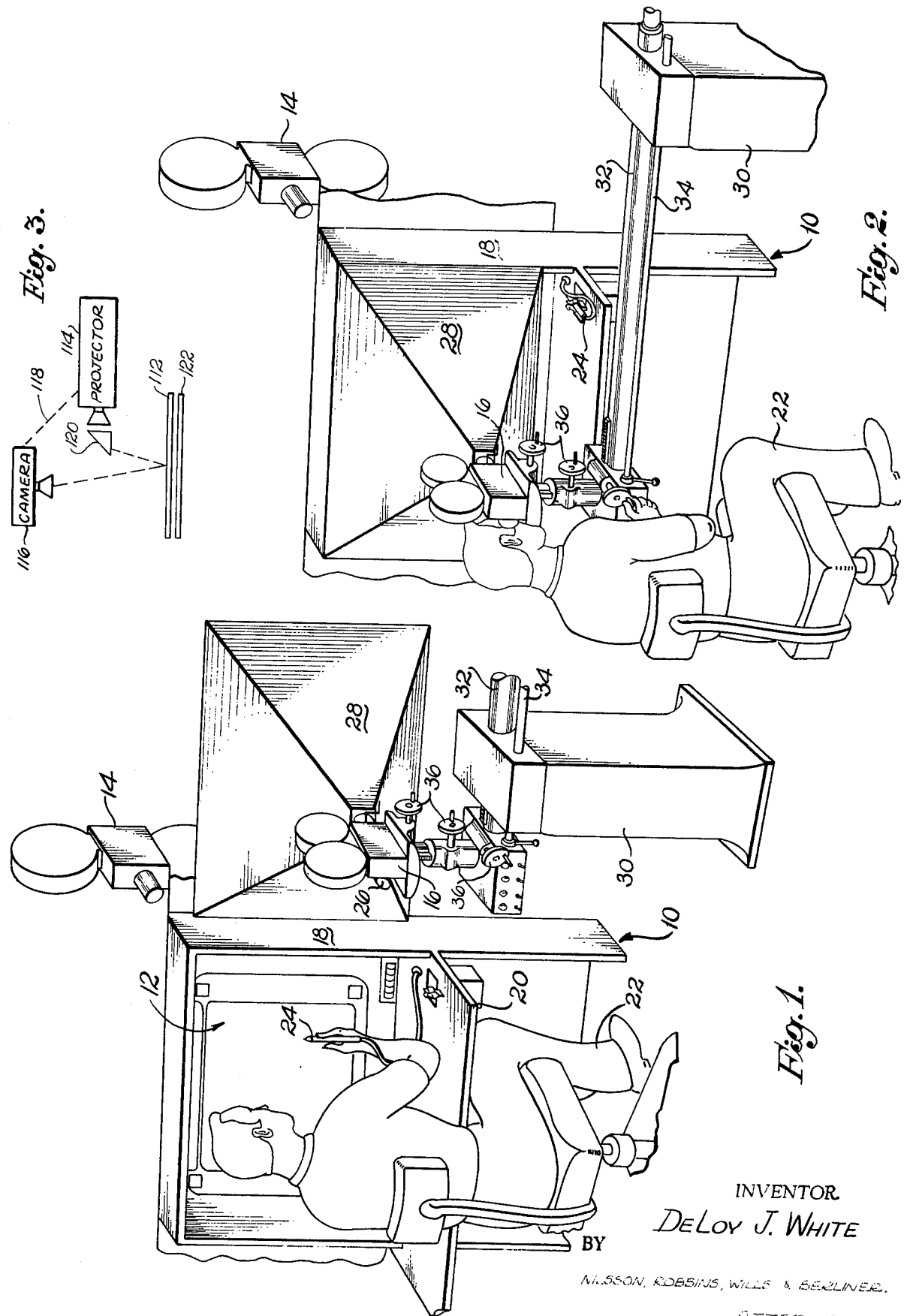

SYSTEM FOR PRODUCING A COLORED MOTION PICTURE FILM FROM BLACK-AND-WHITE MEDIUM

BACKGROUND AND SUMMARY OF THE INVENTION

Various approaches have been taken in efforts to convert black-and-white motion pictures to provide a color presentation. The desire for a practical and economic process of attaining that conversion, stems from two basic considerations. First, a large number of black-and-white motion pictures (particularly classic films) would have considerably-increased audience appeal, and thus value, if they were converted to provide a color display. Second, in some situations it may be economical to produce a black-and-white motion picture film, film-sequence, or television commercial, then subsequently color the film. That approach is feasible to avoid the significantly-increased costs attendant color production. It should be appreciated in that regard, that the increased cost of color photographic film is compounded by the additional requirements of costumes, special makeup, lighting, special sets and color-related props.

One method of adding color to a black-and-white motion picture is disclosed in U.S. Pat. No. 2,127,829 (O'Brien). Essentially, as disclosed in that patent, a black-and-white image from a motion picture frame is projected through a translucent screen that is composed of accurately cut and fitted color filters. The resulting colored light image is then photographed with color-sensitive film. Generally, the system was proposed for imparting color to still background objects which could then be matingly merged with images of foreground objects and actors.

In utilizing the process of the above-referenced O'Brien patent, a separate color filter component member has to be accurately cut and fitted into the complex image filter so as to coincide with each element of the background. Accordingly, the system was never contemplated for use in converting a completed black-and-white motion picture film with actors and foreground detail to color, but rather was only intended to provide an artificially-colored background, e.g. sky, sea, landscape and so on, to be merged with a foreground scene and detail (as on a sound stage) to thereby complete the motion picture film.

Another previously-proposed method of making colored pictures is disclosed in U.S. Pat. No. 2,927,857 (Pohl). Generally, according to the Pohl process a black-and-white image is projected onto a sheet of paper to which color is applied. Subsequently, color-sensitive film is contact-exposed in mating engagement with the black-and-white film while receiving the color-blocked image from the paper, through a lens. To accomplish foreground details, in color by the Pohl process, a series of transparent sheets are superimposed over the background color format.

Generally, the direct-contact film arrangement of the Pohl system presents certain inherent difficulties as necessitating that the color image pass through the black-and-white film in exposing the color-sensitive film. Emulsion problems and inter-surface reflections are also attendant the mating arrangement of the two films. Furthermore, in practicing the Pohl process, each film sequence requires a minimum of one background rendering and a transparency for each frame carrying the foreground objects. Accordingly, the limitations of the system are apparent.

A variety of processes have been utilized in the production of animated cartoons which may be deemed somewhat related or pertinent to the conversion of black-and-white film to a color medium. Summarily, for one reason or another, such techniques are not fully applicable to provide an economical solution to the problem. Specifically, for example, U.S. Pat. No. 1,715,230 (Gilmartin) discloses the use of an opaque cartoon character that is positioned between a projected image and a camera while U.S. Pat. No. 2,450,017 (Place) discloses a technique in which opaque foreground images are super-imposed on background images to be photographed in combination. These techniques are typical and neither is particularly applicable to, or of assistance in solving the problem contemplated by the present invention.

In general, the present invention is directed to a system for converting a black-and-white motion picture film to a colored motion picture film (frame-by-frame) by projecting the black-and-white image from a single frame onto a work surface and applying color to the work surface at selected areas of the projected image to provide a first composite of applied color and black-and-white image, then photographing the composite with color-sensitive film to register the conversion for that frame. Subsequently, the next frame in a sequence is projected from the black-and-white film onto the work surface which is preserved in registration therewith and modified to provide the next composite which is photographed with that frame to register the next color frame.

BRIEF DESCRIPTION OF THE DRAWINGS

FIG. 1 is a perspective view of the apparatus for practicing the present invention, shown in one operating configuration;

FIG. 2 is a perspective view of the apparatus of FIG. 1 shown in another operating configuration;

FIG. 3 is a plan and schematic view of an alternative arrangement to that depicted in FIGS. 1 and 2;

DETAILED DESCRIPTION OF ILLUSTRATIVE EMBODIMENT

Figure 4:
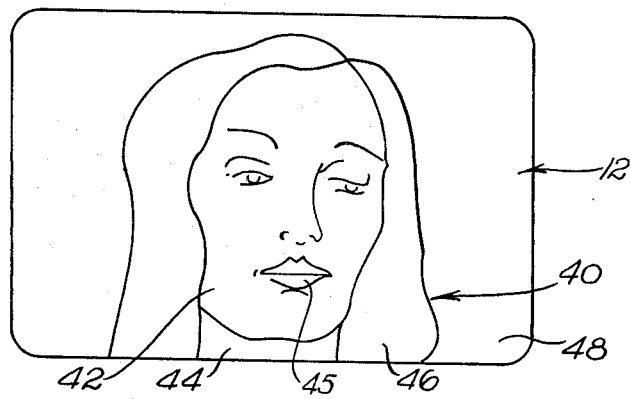
FIG. 4 illustrates an outline of a black-and-white image from a first frame in a sequence of a motion picture film, projected onto a working surface.

Referring initially to FIG. 1, there is shown an operating station for the practice of the system of the present invention. Specifically, a work bench or table 10 incorporates a screen 12 which receives a projected black-and-white image from a spaced-apart projector 14. The projector black-and-white image defines the locations for color that is manually applied to the screen 12. With the completion of the color application, the composite image (projected black-and-white and screen-borne color) is photographed by a camera 16 (FIG. 2)

focused on the screen 12. The point is emphasized that film sequences involving a single scene are converted to color by preserving registration from one frame to the next and altering the color image on the screen 12 or by shifting the screen 12, only as necessary to re-establish coincidence.

Considering the system in greater detail, the projector 14 may take the form of any of a variety of well-known units functional to project an intense, clear, enlarged image on the screen 12. Various material as translucent or semi-transparent plastic, composition or paper may be employed as the screen 12. It may be desirable to provide the screen 12 in the work-table 10 such that it is movable either horizontally or vertically, to accomplish relative displacement to the projected image and thereby re-establish registration in moving from one frame to another.

The table 10 supports the screen 12 in an upright stand 18 and also includes a horizontal bench 20 for the convenience of an operator 22. Of course, any of a wide variety of work stations may be designed to provide a comfortable, convenient and efficient operation.

In applying or painting the color on the screen 12, the operator 22 may use any of a variety of implements or tools, as paint brushes, swabs, or an air brush 24 as indicated in FIG. 1 and as well known in the art. Of course, any of a variety of tints, inks or paints also may be utilized. In that regard, water-soluble paint has been successfully used, which paint may be easily wiped from the screen 12 either for a complete cleaning or to accommodate some small modifications between the frames of a scene. In the performance of such operations, the operator 22 may be assisted by using any of a variety of masks, guides, and so on, as well known in the prior art for improving accuracy and efficiency.

The camera 16 is fitted with a reflex viewer 26 (FIGS. 1 and 2) and a light shield 28. The camera is supportably mounted on a pedestal 30 which telescopically receives a sliding tube 32 and a locking rod 34. The camera 16 is affixed at the left ends of the tube 32 and rod 34, which by sliding through the pedestal 30 manually support the camera 16 either in the quiescent position as shown in FIG. 1 or in the operating position as illustrated in FIG. 2. For registration movements, the camera 16 is provided with a three-dimensional adjustment system as well known in the prior art and as indicated by the crank controls 36.

Figure 5:
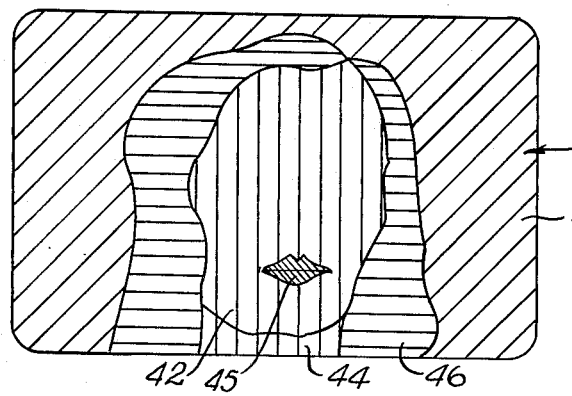
FIG. 5 is illustrative of the colors applied to the working surface as shown in FIG. 2 in accordance with the projected image.

In utilizing the apparatus as depicted in FIGS. 1 and 2 to practice the process hereof, a black-and-white image of an initial frame is first projected on the screen 12, an exemplary form of which is indicated in FIG. 4. The operator then applies the colors with the defined areas as outlined by the black-and-white image. The color pattern is depicted in FIG. 5.

Figure 6:
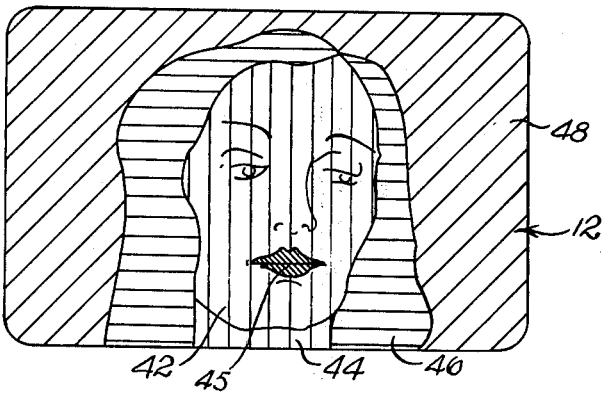
FIG. 6 illustrates the composite of the projected black-and-white image (FIG. 4) and the superimposed color image (FIG. 5)

After the coloring operation is complete, the composite color and black-and-white image is presented on the screen 12 as indicated in FIG. 6, and are so photographed. It is to be noted, that in the specific embodiment hereof, the screen 12 and the applied colors on the screen are light-transmissive in view of the disposition of the projector 14 and the camera 16 on opposite sides of the screen 12. However, it is to be recognized that the camera 16 and the projector 14 might well be mounted on a common platform with the use of a prism or mirrors to compose the composite image from one side of the screen or work surface. Specifically, as represented in FIG. 3, a projector 114 is mounted on a common platform with a camera 116, as represented by a dashed line 118. The camera 116 and the projector 114 are positioned at right angles so that the image from the projector passes through a prism 120, then impinges upon a screen 112. These elements are adjusted to provide optical registration of the projector and the camera film frames.

As depicted in FIG. 3, when the operator has completed the color (as described above) prior to photographing the composite, a first-surface mirror or platen 122 is positioned over the colored surface of the screen 112. In that manner, the previously semi-transparent screen 112, and the paints or dyes thereon are rendered opaque during the operation of the camera 116. It is noteworthy that the operator may work on the side of the screen 112 facing the prism 120, in which case, the screen 112 would not be light transmissive and the platen 122 would not be used.

Returning now to a more-detailed explanation of the operation of the system, as illustrated in FIGS. 1 and 2, after the operator 22 has colored the work surface of the screen 12, the camera 16 is moved into position (FIG. 2) to photograph the composite image on the screen 12. Specifically, the motion-picture camera 16 is caused to photographically record the composite image on a single frame of color-sensitive film.

Next, the operator advances the projector 14 and the camera 16 to provide the next frame of the black-and-white film in the conversion sequence. In some instances, as those involving a still scene, no change in the color image may be necessary. However, it is here emphasized that registration and the maintenance thereof is particularly important during the conversion of a sequence of frames manifesting the particular scene. If the next frame in the sequence depicts movement of an object, the object will be out of synchronization or registration with the colored areas borne on the screen 12. Accordingly, the operator clears away the water-soluble paint as necessary and adds to his rendition or shifts the screen in order again to accomplish synchronization or registration between the colored areas and the black-and-white image. This process is illustrated as indicated above in FIGS. 4, 5, 6 and 7 which will now be considered as a representative conversion.

FIG. 4 shows (somewhat symbolically) an outline of a black-and-white image 40 as manifest on a first frame of a sequence depicting a single scene. Of course, half tones and the like manifest shading and tone levels as well known in the art; however, such details have been eliminated from the figures in the interest of clarity. The image 40 is of a girl's face 42 having skin tones of varying shades. For example, the shade or tone of the girl's shaded neck 44 is substantially darker than the shade or tone of her face. The image also includes the girl's lips 45, her hair 46 and a background 48.

FIG. 5 shows the various colors that are applied to the screen 12 in coincident registration with the image of FIG. 4. Specifically, a skin tone (excluding the lips) is uniformly placed in an area including the face 42 and the neck 44. The lips 46 are colored red, the hair 46 receives another color and the background 48 still another. It is to be noted that the black-and-white image effectively provides the various tonal qualities to the color image when the two components are merged as a composite.

Referring now to FIG. 6 the composite is shown as it appears on the camera-side of the screen 12 (FIG. 1) as indicated above. The somewhat uniformly-colored areas on sthe screen 12 now take on the desired tonal qualities of a dimensional presentation due to the black-and-white half tones. Gradations of the color appear very effectively in the combination color and black-and-white image. Accordingly, the presentation as depicted in FIG. 6 is photographed by the camera 16 (FIG. 2) to provide the frame on color film which may be processed as well known in the prior art to provide the projection of a colored image.

Figure 7:
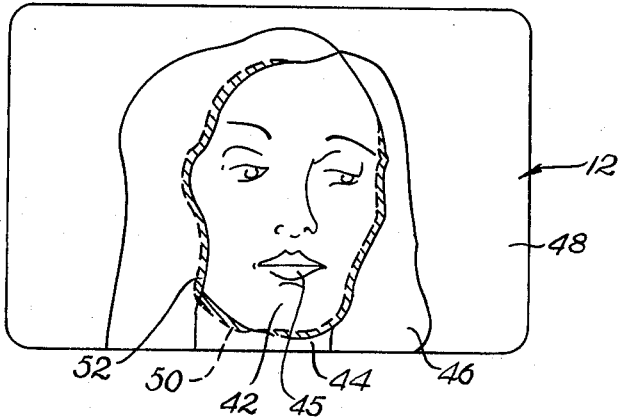
FIG. 7 illustrates the retouching of the color image for a second frame in a sequence of motion picture film to conform the color image to the changed black-and-white image.

Upon completion of the first frame, as indicated above, the operator 22 may advance the film in the projector 14 to provide a somewhat altered image on the screen 12. Specifically, as shown in FIG. 7, the image of the previous frame is depicted by dashed lines 50 while the instant image is depicted in solid lines with the defined area as previously described. It is to be noted that the girl's face has moved with the result that the color definition borne on the screen 12 fails to coincide or register with the projected black-and-white image as indicated by the areas 52. Accordingly, it is simply necessary for the operator 22 to alter the color image slightly or shift the screen 12, to again accomplish coincident registration. In the event that a water-soluble color paint is employed, it may easily be removed. Thus, the operator 22 deletes from and adds to his previous rendition to effect registration. The registered composite is then again photographed on color film by the camera 16 (FIG. 2) to record the composite. Thus, the film is converted frame-by-frame to accomplish the motion picture film in a color medium.

Of course, a variety of specific techniques may be practiced in accordance with the basic system hereof. For example, guides and masks may be generated, film may be processed in the forward or reverse direction as most effectively suited to the conversion, and as indicated above the screen 12 may be moved in some instances to restore registration rather than to employ the basic process of preserving registration and altering the colors. Various other techniques, physical structures and methods will be readily apparent to those skilled in the art in view of the above. Accordingly, the scope hereof is as defined in accordance with the claims as follows:

What is claimed is:

1. The method of converting a black-and-white motion picture film to a colored motion picture film comprising:
    projecting a first black-and-white light image from a first frame of the black-and-white motion picture film onto a surface of a screen;
    painting a spreadable adhering coloring substance on said screen at selected areas of the projected first black-and-white image to provide a first composite of applied color substance and superimposed first black-and-white image;
    while maintaining the projection of the first black-and-white image on said surface, photographing with color-sensitive film said first composite;
    projecting a second black-and-white light image from a second frame of the black-and-white motion picture film onto the surface of the screen;
    painting a spreadable adhering coloring substance on said screen at selected areas as necessary to synchronize the colored areas with said black-and-white image to provide a second composite of applied color substance and superimposed second black-and-white image; and
    while maintaining the projection of the second black-and-white image on said surface, photographing with the color-sensitive film said second composite where the surface bearing coloring substance as applied to register with the first projected frame is horizontally and vertically moveable to effect partial or total registration of previously applied coloring substance to the black-and-white image from the second projected frame.

* * * * *